(12) United States Patent
Krenn et al.

(10) Patent No.: US 9,664,847 B2
(45) Date of Patent: May 30, 2017

(54) LIGHTING DEVICE FOR A MOTOR VEHICLE HEADLIGHT

(71) Applicant: ZIZALA LICHTSYSTEME GMBH, Wieselburg (AT)

(72) Inventors: Irmgard Krenn, Purgstall/Erlauf (AT); Josef Plank, Purgstall/Erlauf (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 302 days.

(21) Appl. No.: 14/395,998

(22) PCT Filed: Apr. 30, 2013

(86) PCT No.: PCT/AT2013/050100
§ 371 (c)(1),
(2) Date: Oct. 21, 2014

(87) PCT Pub. No.: WO2013/166535
PCT Pub. Date: Nov. 14, 2013

(65) Prior Publication Data
US 2015/0124469 A1    May 7, 2015

(30) Foreign Application Priority Data
May 9, 2012    (AT) .............................. A 50165/2012

(51) Int. Cl.
F21V 9/00    (2015.01)
F21V 8/00    (2006.01)
F21S 8/10    (2006.01)

(52) U.S. Cl.
CPC ........ G02B 6/0091 (2013.01); F21S 48/1154 (2013.01); F21S 48/1159 (2013.01);
(Continued)

(58) Field of Classification Search
CPC .... G02B 6/0091; G02B 6/008; G02B 6/0068; G02B 6/0076; G02B 6/0028;
(Continued)

(56) References Cited

U.S. PATENT DOCUMENTS 6,641,290 B2 *   11/2003   Ishiharada ............. B60K 37/02
                                                    362/495
8,348,467 B2 *    1/2013   Khan ........................ F21K 9/61
                                                    362/254
(Continued)

FOREIGN PATENT DOCUMENTS

AT              507679 A4    7/2010
DE         102004033758 A1   2/2006
(Continued)

OTHER PUBLICATIONS

First Office Action of Austrian priority application No. A 50165/2012 dated Mar. 5, 2013.
(Continued)

Primary Examiner — Anh Mai
Assistant Examiner — Glenn Zimmerman
(74) Attorney, Agent, or Firm — Eversheds Sutherland (US) LLP

(57) ABSTRACT

The invention relates to a lighting device (100) for a motor vehicle headlight, comprising a number of light sources (1), at least one attachment optical unit (2), having a light entrance surface (2a) and a light exit surface (2b), wherein the at least one attachment optical unit (2) comprises a plurality of light-guiding bodies (3), and wherein each light-guiding body (3) has a light entrance surface (3a), into which in each case at least one light source (1) feeds light, and wherein the light-guiding bodies (3) lead into the common light exit surface (2b). According to the invention, at least one, preferably exactly one, position holder (4) is
(Continued)

Figure 1:
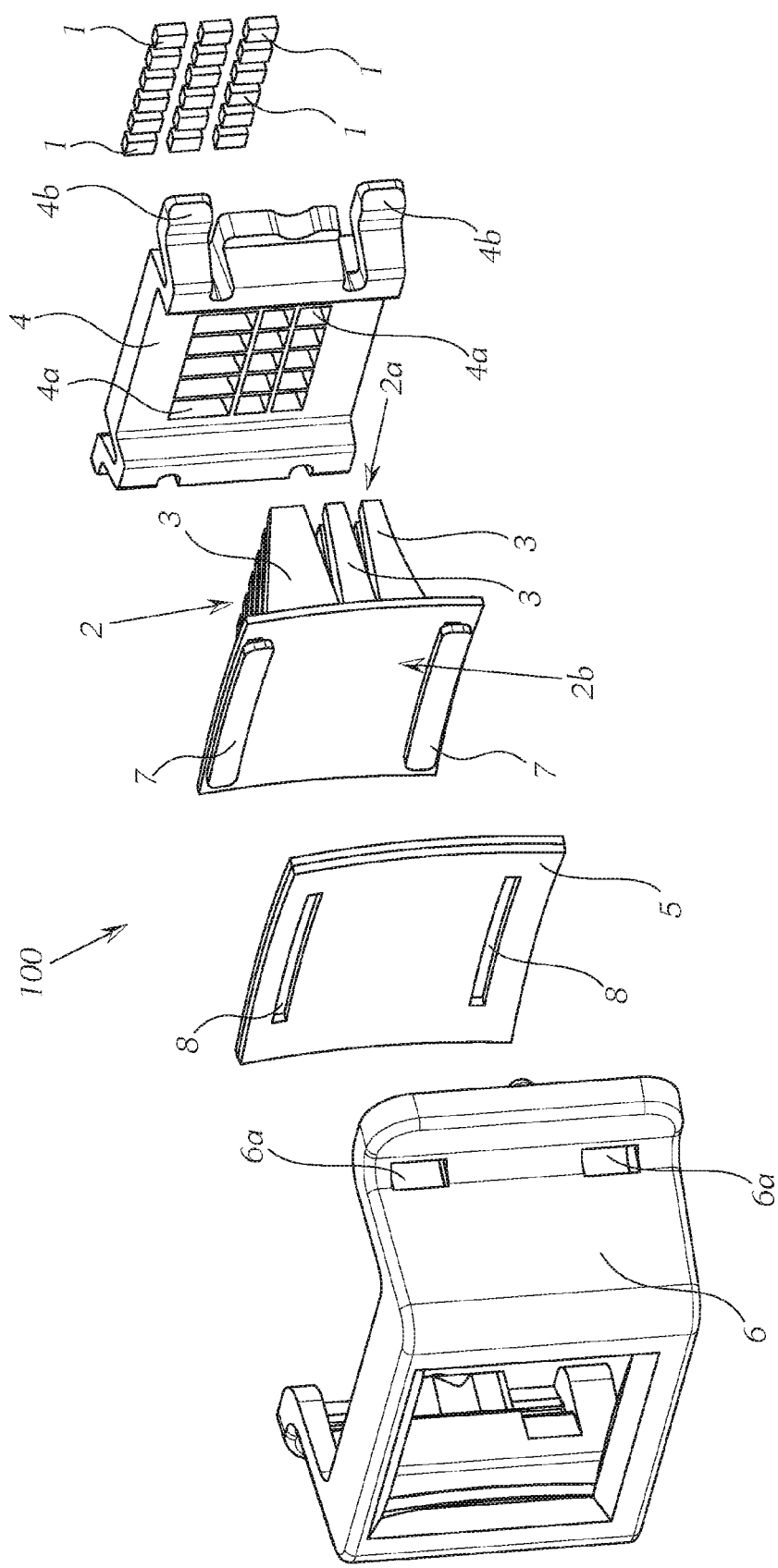

provided, by means of which the light entrance surfaces (3*a*) of the light-guiding bodies (3) of the at least one attachment optical unit (2) are held in position in relation to the light sources (1). Alternatively or additionally, provision can be made for the light exit surface (2*b*) of the at least one attachment optical unit (2) to be provided with a transparent light plate (5) for the dimensional stabilization of the at least one attachment optical unit (2).

26 Claims, 4 Drawing Sheets

(52) U.S. Cl.
CPC ......... *F21S 48/1241* (2013.01); *F21S 48/145* (2013.01); *F21S 48/1747* (2013.01); *G02B 6/0008* (2013.01); *G02B 6/0068* (2013.01); *G02B 6/0076* (2013.01); *G02B 6/0028* (2013.01); *G02B 6/0078* (2013.01)

(58) Field of Classification Search
CPC . G02B 6/0078; F21S 48/1154; F21S 48/1159; F21S 48/1241; F21S 48/145; F21S 48/1747
USPC .................................. 362/511, 521, 543, 161
See application file for complete search history.

(56) References Cited

U.S. PATENT DOCUMENTS

| | | | |
|---|---|---|---|
| 2004/0041984 A1* | 3/2004 | Tani | F21V 7/0091 353/20 |
| 2004/0057027 A1 | 3/2004 | Tani | |
| 2005/0025904 A1* | 2/2005 | Giroud | B41M 5/24 427/532 |
| 2006/0215401 A1 | 9/2006 | Menzel et al. | |
| 2007/0008734 A1 | 1/2007 | Bogner et al. | |
| 2008/0013333 A1* | 1/2008 | Koizumi | B60Q 1/2696 362/511 |
| 2008/0048200 A1* | 2/2008 | Mueller | B29C 41/14 257/98 |
| 2008/0130137 A1 | 6/2008 | Angelini et al. | |
| 2008/0253144 A1 | 10/2008 | Dolson et al. | |
| 2009/0016074 A1 | 1/2009 | Dolson et al. | |
| 2009/0129079 A1 | 5/2009 | Grotsch et al. | |
| 2009/0213606 A1* | 8/2009 | Coushaine | F21S 48/1154 362/507 |
| 2011/0141442 A1 | 6/2011 | Auerbach et al. | |

FOREIGN PATENT DOCUMENTS

| | | |
|---|---|---|
| DE | 102006002322 A1 | 12/2007 |
| EP | 2306073 A2 | 4/2011 |
| EP | 2306077 A2 | 4/2011 |
| WO | 2007027474 A2 | 3/2007 |

OTHER PUBLICATIONS

International Search Report of international application No. PCT/AT2013/050100 dated dated Dec. 17, 2013.

* cited by examiner

LIGHTING DEVICE FOR A MOTOR VEHICLE HEADLIGHT

The invention relates to a lighting device for a motor vehicle headlight, comprising a number of light sources, at least one attachment optical unit, having a light entrance surface and a light exit surface, wherein the at least one attachment optical unit comprises a plurality of light-guiding bodies, and wherein each light-guiding body has a light entrance surface, into which in each case at least one light source feeds light, and wherein the light-guiding bodies lead into the common light exit surface.

The invention also relates to a light module, which consists of an above-mentioned lighting device or at least comprises a lighting device of this type. The invention additionally also relates to a motor vehicle headlight comprising at least one of the above-mentioned lighting devices or comprising at least one light module, which comprises at least one of the above-mentioned lighting devices.

Above-mentioned lighting devices are used in conjunction with light modules or motor vehicle headlights in order to produce light distributions. Attachment optical units are usually used that are made of glass, with which simple geometries can be provided for attachment optical units. If, by contrast, more complex geometries are necessary for an attachment optical unit, the use of glass is often unsuitable for this purpose.

It has been found that transparent, in particular highly transparent, light-conducting and formable plastics constitute a well-suited material instead of glass in the production of complex geometries. Poly(organo)siloxanes are particularly well suited for the production of complex attachment optical units, and it is of particular advantage if the at least one attachment optical unit is produced from a silicone material.

A disadvantage, however, of the use of such plastics, in particular of silicone to produce attachment optical units is the fact that such an attachment optical unit does not have the strength of a glass element. However, it is advantageous or necessary from an optical viewpoint for the attachment optical unit to have a design that is as stable as possible, in particular in respect of the positioning of the light entrance surface thereof or light entrance surfaces thereof in relation to the light sources. An offset of the light entrance surfaces in relation to the light sources, in particular with the use of light-emitting diodes and light sources, leads for example to undesirable light losses.

An offset of the light exit surface of the attachment optical unit may again mean that the projected light exposure does not correspond to the desired requirements.

The object of the invention is to create a lighting device with an attachment optical unit, with which the above-mentioned problems are overcome.

This object is achieved with a lighting device of the type mentioned in the introduction in that, in accordance with the invention, at least one, preferably exactly one, position holder is provided, by means of which the light entrance surfaces of the light-guiding bodies of the at least one attachment optical unit are held in position in relation to the light sources.

Due to such a position holder, the light-guiding bodies or the light entrance surfaces thereof can be positioned exactly in relation to the light exit surfaces of the light sources, such that the light losses that would occur with an inaccurate positioning can be minimised. An oscillation of the attachment optical unit—which may occur above all when the vehicle is being driven as a result of vibrations of the vehicle—, in particular of the light-guiding bodies and therefore of the light entrance surfaces in the y- and z-direction can thus be prevented. Here, the y- and z-direction are normal to one another and are arranged substantially in the plane of the light entrance surface of the attachment optical unit, whereas the x-direction is normal to the plane spanned by y and z.

Such a position holder additionally has the effect, presupposing that said position holder is formed from a suitable material, as will be explained further below in greater detail, that the stray light exiting from the LEDs/light sources, for example light-emitting diodes, is separated by the position holder.

This object is also achieved with a lighting device of the type mentioned in the introduction in that, in accordance with the invention, the light exit surface of the at least one attachment optical unit is provided with a transparent light plate for the dimensional stabilisation of the at least one attachment optical unit.

Due to such a fixed or rigid light plate, the attachment optical unit can be stabilised in the region of the light exit surface thereof, such that disadvantageous optical effects occurring otherwise can be prevented.

With the light exit surface of the attachment optical unit, an oscillation in the y- and z-direction does not pose so much of a problem, rather there is the risk that in particular the middle region of the light exit surface may start to oscillate in the x-direction. This oscillation can also be prevented by the light plate.

It is of course of particular advantage if the two above-mentioned measures, that is to say the fact that at least one, preferably exactly one, position holder is provided, by means of which the light entrance surfaces of the light-guiding bodies are held in position in relation to the light sources, and the fact that the light exit surface of the attachment optical unit is also provided for dimensional stabilisation of the attachment optical unit with a transparent, in particular a highly transparent, light plate, are provided jointly in a lighting device according to the invention.

It is particularly advantageous if the light exit surface of the attachment optical unit is overmoulded by the transparent light plate.

By way of example, this overmoulding is performed by means of a 2-component injection-moulding method.

In view of a high stability of the attachment optical unit, it is advantageous if the light exit surface is overmoulded over the entire area with the transparent light plate.

Compared with the use of a prefabricated plate, a subsequent mounting step is omitted as a result of the overmoulding with the light plate. In addition, there is no air gap between the light plate and light exit surface of the attachment optical unit, which could additionally cause undesirable light refractions.

It is particularly advantageous if the light exit surface is fabricated from a plastic, preferably from a thermoplastic, particularly preferably from a temperature-resistant thermoplastic, in particular PC ("polycarbonate"). Here, the light plate should be temperature-resistant up to at least approximately 150° C.

However, the light plate may also be prefabricated and then fitted on the attachment optical unit, for example mechanically fixed. With use of a prefabricated light plate, it may be advantageous in particular if said light plate is adhesively bonded by means of an optically transparent adhesive to the light exit surface of the attachment optical unit, such that an air gap can be avoided.

It is further advantageous when the position holder is fabricated from a plastic, in particular a thermoplastic. Thermoplastic can be better formed for example compared with thermosets.

Here, it is particularly advantageous if the position holder is fabricated from a material shadowing stray light, that is to say a light-impermeable material for example made of black plastic, in particular (for example black) thermoplastic, such that stray light in particular from adjacent light sources, in particular light-emitting diodes, is separated.

A further, alternative or preferably additional measure for avoiding light losses in the position holder is that of forming the position holder in such a way that the contact area of a light-guiding body (or the light-guiding body) with the position holder is as small as possible.

The light-guiding body thus contacts the position holder only in a narrow contact region, for example in a line running around the respective light guide.

The individual light-guiding bodies can be held particularly well in the position thereof in relation to the light sources when the position holder has a receptacle for each light-guiding body, in which receptacle the associated light-guiding body is received and positioned with an accurate fit.

The receptacles are holes or openings in the position holder, with exactly matched cross section for the light-guiding body; these are plugged into the associated receptacles and are held in the desired position by this position holder.

Since, in particular, the exact positioning of the light entrance surfaces is significant, it is expedient when the position holder receives the light-guiding bodies at the end regions thereof facing the light entrance surfaces.

Here, the light-guiding bodies may protrude slightly from the receptacle toward the rear or may finish flush with the position holder.

Furthermore, a material may also be inserted into the receptacles, between the position holder and the light-guiding bodies, said material having a lower refractive index than the material of the light-guiding bodies.

In particular, it is advantageous if the material of lower refractive index surrounds the light-guiding element in such a way that this does not contact the position holder.

The limit angle for total reflection is thus increased, such that no light or only small quantities of light exit from the light-guiding body.

In accordance with a specific embodiment, the light-guiding bodies are elongate, with a greater extension in the direction of propagation of the light than transversely thereto.

In addition, each light source preferably comprises one or more light-emitting diodes. Each light source can preferably be actuated separately and can be switched on and switched off accordingly, and preferably also can be dimmed. If a light source consists of a plurality of light-emitting diodes, it may also be advantageous if each of the light-emitting diodes can be actuated separately.

Lastly, it is advantageous if the light-guiding bodies have a cross section tapering toward the light entrance surfaces thereof.

Due to the cross sections of the light-guiding bodies thus increasing in the direction of light propagation, the position holder can be slid onto the light-guiding bodies only up to a certain point, where it is then fixed, for example in a clamped manner. Alternatively or additionally to the clamped positioning, the position holder can also be fixed or held in the desired position with a holder, as already mentioned above, for the attachment optical unit, by means of which holder the attachment optical unit (together with the light plate and the position holder) is fixed for example in a light module or in a vehicle headlight.

By way of example, the light-guiding bodies may be formed in the manner of a truncated cone or in a trapezoidal manner.

In principle, all multi-sided truncated pyramids can be considered, for example hexagonal, for example in the form of wedge-shaped honeycombs. The base area shape is closely related to the LED chip arrangements and the desired light entrance and exit.

As already mentioned in the introduction, the at least one attachment optical unit is fabricated from a transparent, in particular highly transparent, light-guiding and formable plastic. By way of example, the at least one attachment optical unit is produced from a poly(organo)siloxane.

It is particularly advantageous if the at least one attachment optical unit is produced from a silicone material.

Figure 2:
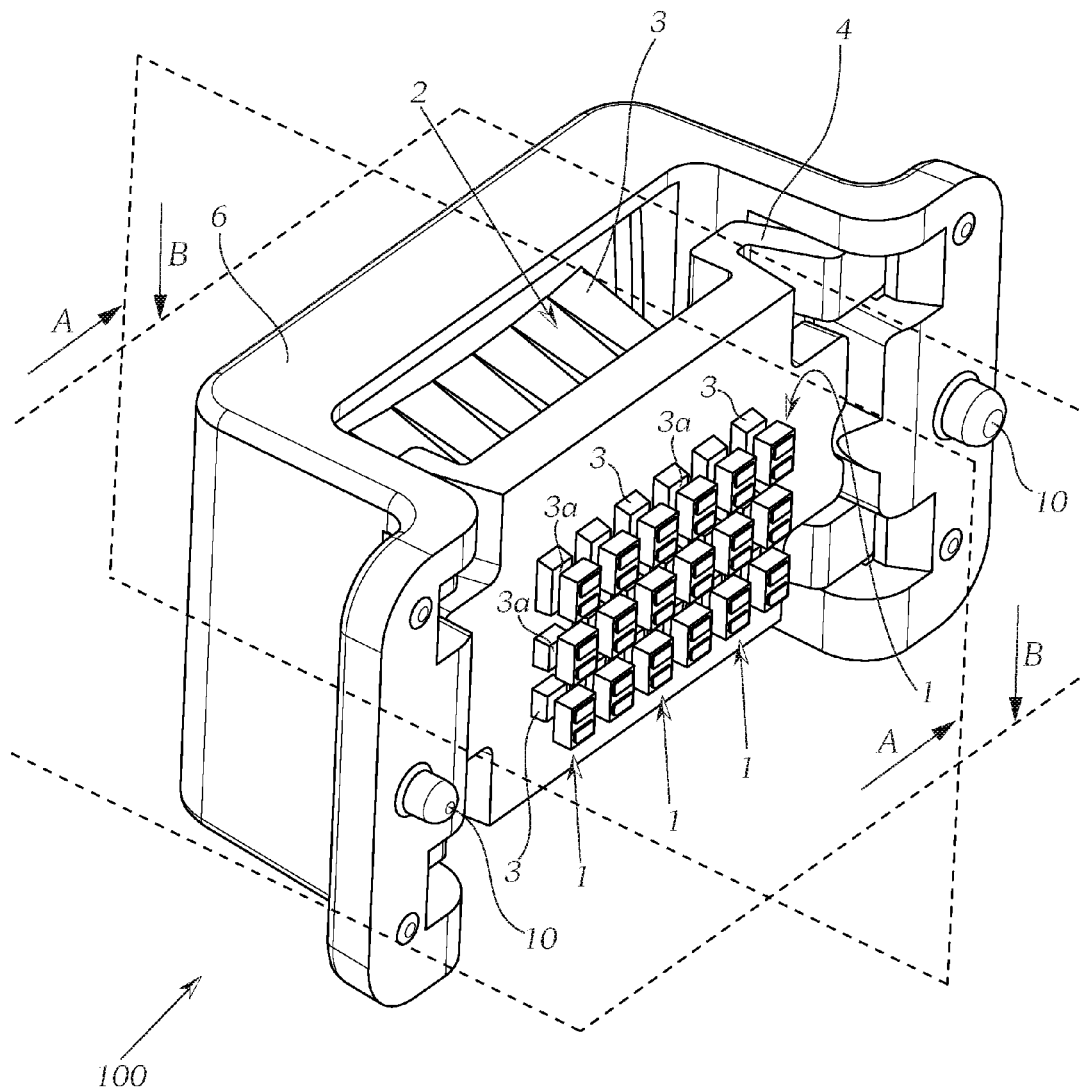
Figure 3:
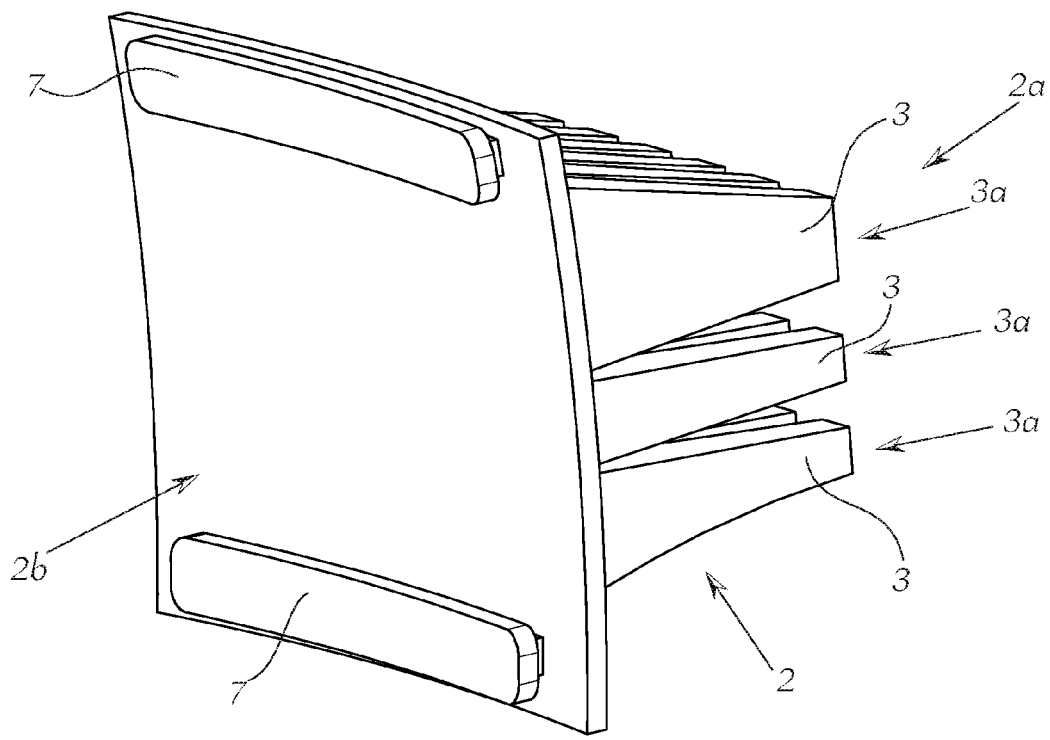
Figure 4:
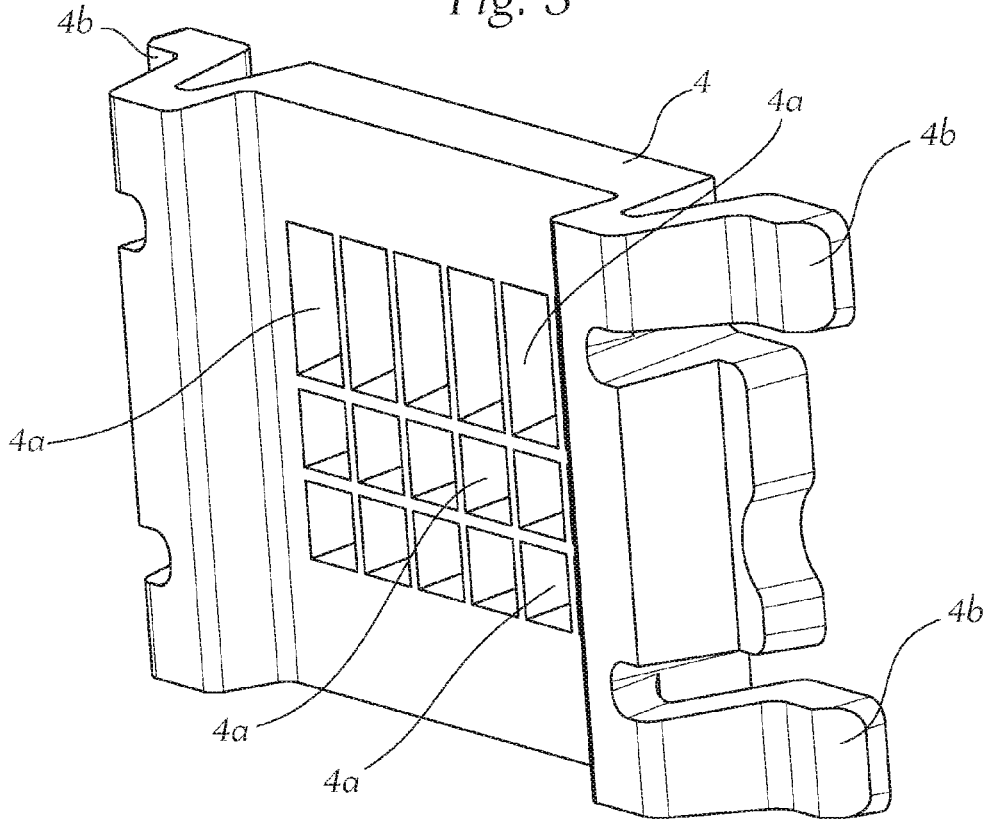
Figure 5:
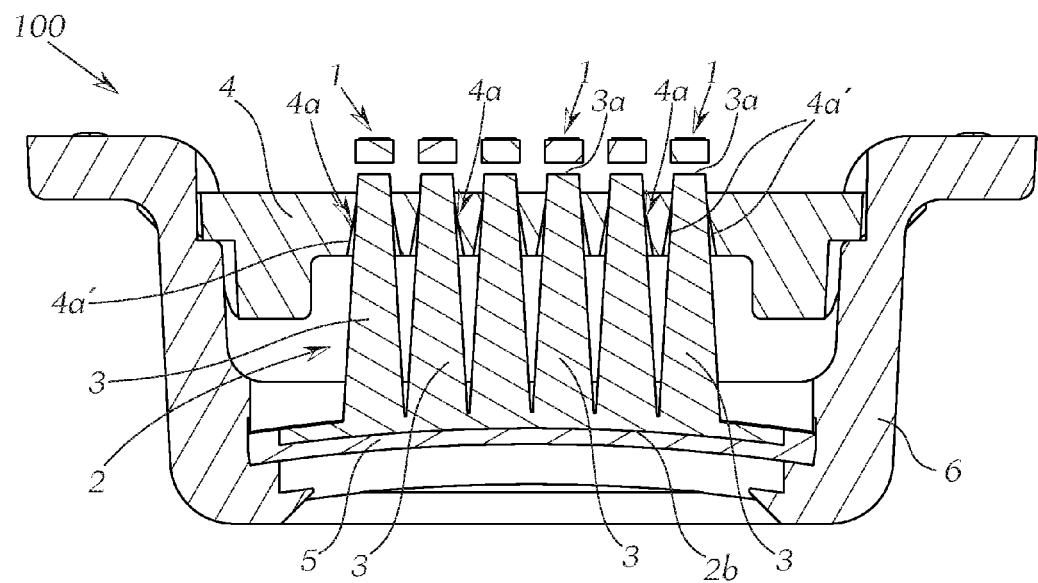
Figure 6:
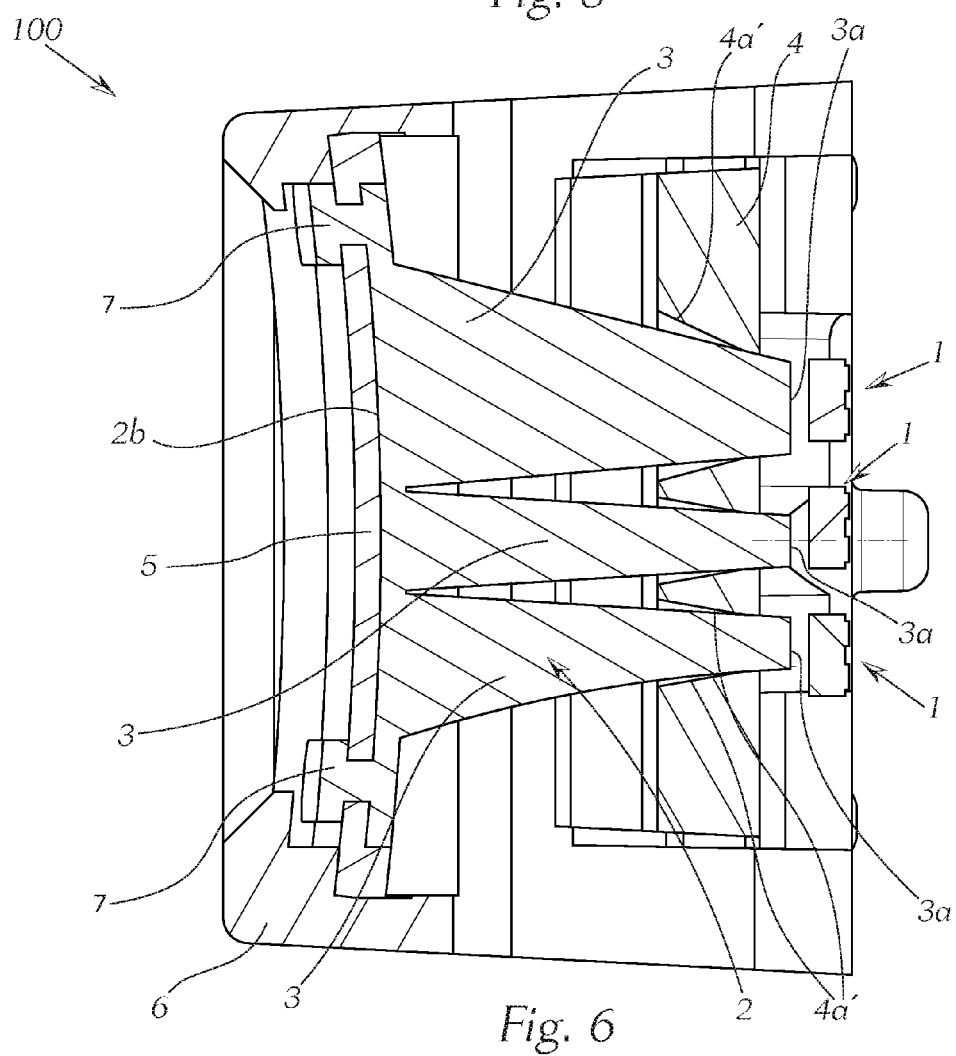

The invention will be explained hereinafter in greater detail on the basis of the drawing. In the drawing FIG. 1 shows a lighting device according to the invention in an exploded illustration, FIG. 2 shows a perspective illustration of the assembled lighting devices according to the invention from FIG. 1 in a view diagonally from behind, FIG. 3 shows an attachment optical unit made of silicone with a number of light-guiding bodies, FIG. 4 shows a position holder according to the invention for the light-guiding bodies of an attachment optical unit as illustrated in FIG. 3, FIG. 5 shows a horizontal section through the lighting device according to the invention along the plane B-B in FIG. 2, and FIG. 6 shows a vertical section through a lighting device from FIG. 2 along the plane A-A.

FIG. 1 shows a lighting device 100 according to the invention for a motor vehicle headlight in an exploded illustration. The lighting device 100 here comprises a number of light sources 1, wherein, in a specific embodiment, each light source consists of one or more light-emitting diodes.

Furthermore, the lighting device 100 comprises an attachment optical unit 2, which is formed from an above-mentioned plastic, in particular from a silicone material. The attachment optical unit 2 has a light entrance surface 2a and a light exit surface 2b.

As can also be seen, the attachment optical unit 2 comprises a plurality of light-guiding bodies 3, wherein each light-guiding body 3 has a light entrance surface 3a, into which in each case at least one, preferably exactly one, light source 1 feeds light. There is a narrow gap between the light sources (or light exit surfaces thereof) and the light entrance surfaces 3a.

The light entrance surfaces 3a of the individual light-guiding bodies 3 thus form the light entrance surface 2a of the attachment optical unit 2, and the light entrance surface 2a of the attachment optical unit 2 thus consists of a number of individual surfaces 3a.

The light-guiding bodies 3 lead into the common light exit surface 2b, via which the fed light exits again from the attachment optical unit 2 and is projected as a light distribution in an area in front of a vehicle (based on the situation in which the lighting device is installed in a vehicle). Here, the projection is generally produced by a secondary optical unit, for example a lens, through which the light exiting from the attachment optical unit passes.

Here, the fed light propagates into the light-guiding bodies by means of total reflection.

An attachment optical unit 2 is shown in FIG. 3, again in a larger illustration, and here it can be seen that in the shown variant the upper row of light-guiding bodies 3 has a greater extension in a vertical direction than the light-guiding bodies 3 in the lower two rows. However, this is merely intended to express the fact that the light-guiding bodies in principle may all have the same form, but may also have any different embodiments, depending on the desired light distribution, etc.

FIG. 1 further shows a position holder 4, by means of which the light entrance surfaces 3a of the light-guiding elements 3 of the attachment optical unit 3 are held in position in relation to the light sources 1.

As can be clearly seen in FIG. 1 and particularly in FIG. 4, the position holder 4 in the shown embodiment for this purpose has a receptacle 4a for each light-guiding body 3, in which receptacle the associated light-guiding body 3 is received and positioned with an accurate fit.

The receptacles are holes or openings in the position holder 4, with exactly adapted cross section for the respective light-guiding body 3; the light-guiding bodies 3 are plugged into the associated receptacles 4a and are thus held in the desired position by the position holder.

In the shown variant, the light-guiding bodies 3 are elongate, with a greater extension in the direction of propagation of the light than transversely thereto. In addition, the light-guiding bodies 3 have a cross section tapering toward the light entrance surfaces 3a thereof. By way of example, the light-guiding bodies 3 may be formed in the manner of a truncated cone or may be trapezoidal, as shown in the figures.

Due to the cross sections of the light-guiding bodies 3 thus increasing in the direction of light propagation, the position holder can be slid onto the light-guiding bodies 3 only up to a certain point, where it is then fixed, for example in a clamped manner.

This situation can be clearly seen in FIGS. 5 and 6, which show the lighting device 100 according to the invention in the assembled state.

As can be clearly seen in FIGS. 1, 5 and 6 and also in FIG. 2, which shows the lighting device in a perspective illustration in the assembled state, a holder 6 for the attachment optical unit is additionally provided, by means of which holder 6 the attachment optical unit 2 (together with a light plate 5 and the position holder 4) is fixed for example in a light module or in a vehicle headlight.

With this holder 6, the position holder 4 is additionally held on the light-guiding bodies 3 of the attachment optical unit 2 in such a way that the position holder 4 cannot slip down from the light-guiding bodies 3. To this end, corresponding stops 4b are provided on the position holder 4, by means of which stops the position holder 4 stops in accordingly adapted recesses 6a in the holder 6 (see FIG. 1 and FIG. 4) and is thus secured against a movement against the light propagation and is thus fixed or held in the desired position.

The position holder 4 is advantageously fabricated from a plastic, in particular a thermoplastic. Here, it is particularly advantageous when the position holder 4 is fabricated from a black plastic, in particular black thermoplastic.

A measure for avoiding light losses in the position holder is the fact that the position holder 4 is formed in such a way that the contact area of the light-guiding body 3 (or of the light-guiding bodies) with the position holder 4 is as small as possible. To this end, as can be clearly seen in FIGS. 5 and 6, the receptacles 4a have a cross section tapering toward the rear, wherein this cross section is preferably narrowed to a greater extent than that of the light-guiding bodies 3. The delimiting walls 4a' of the receptacles 4a thus converge more strongly than is the case with the light-guiding bodies 3, as can be clearly seen in FIGS. 5 and 6, and therefore the light-guiding bodies 3 contact the delimiting walls 4a' only in a narrow region, virtually along a line.

Since, in particular, the exact positioning of the light entrance surfaces is significant, the receptacles 4a of the position holder 4 preferably receive the light-guiding bodies 3, as illustrated, at the end regions facing the light entrance surfaces 3a thereof, wherein the light-guiding bodies 3 for example protrude slightly from the receptacles 4a toward the rear, as shown.

Due to a position holder 4, the light-guiding bodies or light entrance surfaces thereof can thus be positioned exactly in relation to the light exit surfaces of the light sources, as explained, such that the light losses that would occur with an inaccurate positioning can be minimised.

In addition, such a position holder also has the effect, presupposing that it is formed from a suitable material, for example from a black thermoplastic, that the stray light exiting from the light sources, for example light-emitting diodes, is intercepted by the position holder.

Returning again to FIG. 1, in the case of the shown lighting device 100, the light exit surface 2b of the attachment optical unit 2 made of silicone is also provided with a transparent light plate 5 for dimensional stabilisation.

Due to such a fixed or rigid light plate, the attachment optical unit can be stabilised in the region of the light exit surface thereof, such that disadvantageous optical effects otherwise occurring can be prevented.

It is of particular advantage if the light exit surface 2b of the attachment optical unit 2 is overmoulded with the transparent light plate 5. By way of example, this overmoulding is performed by means of a 2-component injection-moulding method.

In view of a high stability of the attachment optical unit, it is advantageous if the light exit surface 2b is overmoulded over the entire area with the transparent light plate 5.

Here, during the manufacturing process, the attachment optical unit 2 is manufactured first, wherein webs 7 are formed by the mould used. In a second step, the light plate 5 is moulded and then rests directly against the attachment optical unit 3 and holds the light plate 5 on the attachment optical unit 2 due to the back-injection of the webs 7. Here, in the illustration according to FIG. 1, the light plate 5 has slot-like openings 8, however this is only a fictional illustration of the case that the light plate 5 would be separable from the attachment optical unit 2 without destruction. In reality, the light plate 5 is moulded directly onto the attachment optical unit, such that a destruction-free separation as illustrated in FIG. 1 is not possible.

Contrary to the illustration in the figures, it would also be possible in a further variant for the holder 6 to be moulded onto the part consisting of attachment optical unit and light plate.

It is of particular advantage if the light exit surface is fabricated from a plastic, preferably from a thermoplastic, particularly preferably from a temperature-resistant thermoplastic, in particular PC.

However, the light plate can also be fixed in the holder 6 for the attachment optical unit 2, for example clipped in or fixed in another manner known from the prior art, and is held in position in this way in front of the light exit surface of the attachment optical unit.

With a lighting device according to the invention, a dipped beam or daytime running beam can be produced by way of example, for which purpose the left headlight and the right headlight each comprise a lighting device according to the invention, with which the left and right part of the light distribution are produced respectively. Here, a secondary optical unit, generally a lens (not illustrated), is also provided in the light exit direction in front of the holder 6 and is used to produce the respective light distribution.

The lighting device according to the invention can also be used, however, for a reverse light.

Lastly, FIG. 2 again shows the lighting device 100 according to the invention in the assembled state. The attachment optical unit 2, position holder 4, light plate 5 and holder 6 form a unit here, wherein the attachment optical unit 2 is connected via the position holder 4 and the light plate 5 is connected to the holder 6. The light sources 1 are installed separately from this unit in the headlight, as is the lens (not illustrated). The holder 6 is connected to the headlight via suitable fixing elements and for example sits on a dedicated support.

The holder 6 is fixed here in the correct position in the headlight housing in relation to the light sources by means of suitable fixing elements 10, for example in the form of journals or pins, and the light sources themselves are fitted on a heat sink (not illustrated).

The invention claimed is:

1. A lighting device (100) for a motor vehicle headlights comprising:
   a plurality of light sources (1);
   at least one attachment optical unit (2) having a light entrance surface (2*a*) and a common light exit surface (2*b*), wherein the at least one attachment optical unit (2) comprises a plurality of light-guiding bodies (3), and wherein each light-guiding body (3) has a light entrance surface (3*a*), into which in each case at least one light source (1) feeds light, and wherein the light-guiding bodies (3) lead into the common light exit surface (2*b*); and
   at least one position holder (4) which holds the light entrance surfaces (3*a*) of the light-guiding bodies (3) of the at least one attachment optical unit (2) in position in relation to the light sources (1), wherein the position holder (4) for each light-guiding body (3) has a receptacle (4*a*), in which the associated light-guiding body (3) is received and positioned with an accurate fit,
   wherein the receptacles (4*a*) have a cross section tapering toward the rear, wherein this cross section is narrowed to a greater extent than that of the light-guiding body (3) such that delimiting walls of the receptacles (4*a*) have a greater convergence than delimiting walls of the light-guiding bodies (3), resulting in the light-guiding bodies (3) contacting the delimiting walls of the receptacles (4*a*) in a narrow region substantially along a line.

2. The lighting device according to claim 1, wherein the light exit surface (2*b*) of the attachment optical unit (2) is provided with a transparent light plate (5) for the dimensional stabilisation of the attachment optical unit (2).

3. The lighting device according to claim 1, wherein the position holder (4) is fabricated from a thermoplastic.

4. The lighting device according to claim 1, wherein the position holder (4) receives the light-guiding bodies (3) at the end regions thereof facing the light entrance surfaces (3*a*).

5. The lighting device according to claim 1, wherein the light-guiding bodies (3) are elongate, with a greater extension in the direction of propagation of the light than transversely thereto.

6. The lighting device according to claim 1, wherein each light source comprises one or more light-emitting diodes.

7. The lighting device according to claim 1, wherein the light-guiding bodies (3) have a cross section tapering toward the light entrance surfaces (3*a*) thereof.

8. The lighting device according to claim 1, wherein the light-guiding bodies (3) are formed in the manner of a truncated cone or in a trapezoidal manner.

9. The lighting device according to claim 1, wherein the at least one attachment optical unit (2) is fabricated from a transparent and formable plastic.

10. The lighting device according to claim 1, wherein the at least one attachment optical unit (2) is produced from a silicone material.

11. The lighting device according to claim 1, wherein the at least one attachment optical unit (2) is produced from a poly(organo)siloxane.

12. A lighting module comprising at least one lighting device according to claim 1.

13. A vehicle headlight comprising at least one lighting device according to claim 1.

14. The lighting device according to claim 1, wherein the at least one position holder comprises exactly one position holder.

15. A lighting device (100) for a motor vehicle headlight comprising:
   a plurality of light sources (1);
   at least one attachment optical unit (2) having a light entrance surface (2*a*) and a common light exit surface (2*b*), wherein the at least one attachment optical unit (2) comprises a plurality of light-guiding bodies (3), and wherein each light-guiding body (3) has a light entrance surface (3*a*), into which in each case at least one light source (1) feeds light, wherein the light-guiding bodies (3) lead into the common light exit surface (2*b*); and
   a transparent, rigid light plate (5) for the dimensional stabilisation of the at least one attachment optical unit (2), said light plate being arranged after the light exit surface (2*b*) of the at least one attachment optical unit (2) in the direction of light propagation and directly against the light exit surface (2*b*) of the at least one attachment optical unit (2).

16. The lighting device according to claim 15, wherein at least one position holder (4) is provided, by means of which the light entrance surfaces (3*a*) of the light-guiding bodies (3) are held in position in relation to the light sources (1).

17. The lighting device according to claim 15, wherein the light exit surface (2*b*) of the attachment optical unit (2) is overmoulded with the transparent light plate (5).

18. The lighting device according to claim 15, wherein the light exit surface is fabricated from a plastic.

19. The lighting device according to claim 16, wherein the at least one position holder (4) is fabricated from black plastic.

20. The lighting device according to claim 16, wherein the position holder (4) has a receptacle (4*a*) for each light-guiding body (3), in which receptacle the associated light-guiding body (3) is received and positioned with an accurate fit.

21. The lighting device according to claim 16, wherein the at least one position holder comprises exactly one position holder.

22. The lighting device according to claim 17, wherein the light exit surface (2b) is overmoulded over the entire area with the transparent light plate (5).

23. The lighting device according to claim 18, wherein the plastic comprise polycarbonate or another thermoplastic.

24. The lighting device according to claim 19, wherein the black plastic comprise a thermoplastic.

25. The lighting device according to claim 20, wherein a material is introduced into the receptacles (4a), in each case between the position holder (4) and the light-guiding bodies (3), said material having a lower refractive index than the material of the light-guiding bodies (3).

26. The lighting device according to claim 25, wherein the material with lower refractive index surrounds the light-guiding body (3) in such a way that said light-guiding body does not contact the position holder (4).

* * * * *